G. P. HEINRICH & J. E. DUNN.
ELECTRIC BATTERY.
APPLICATION FILED MAR. 18, 1915.
1,161,668.
Patented Nov. 23, 1915.
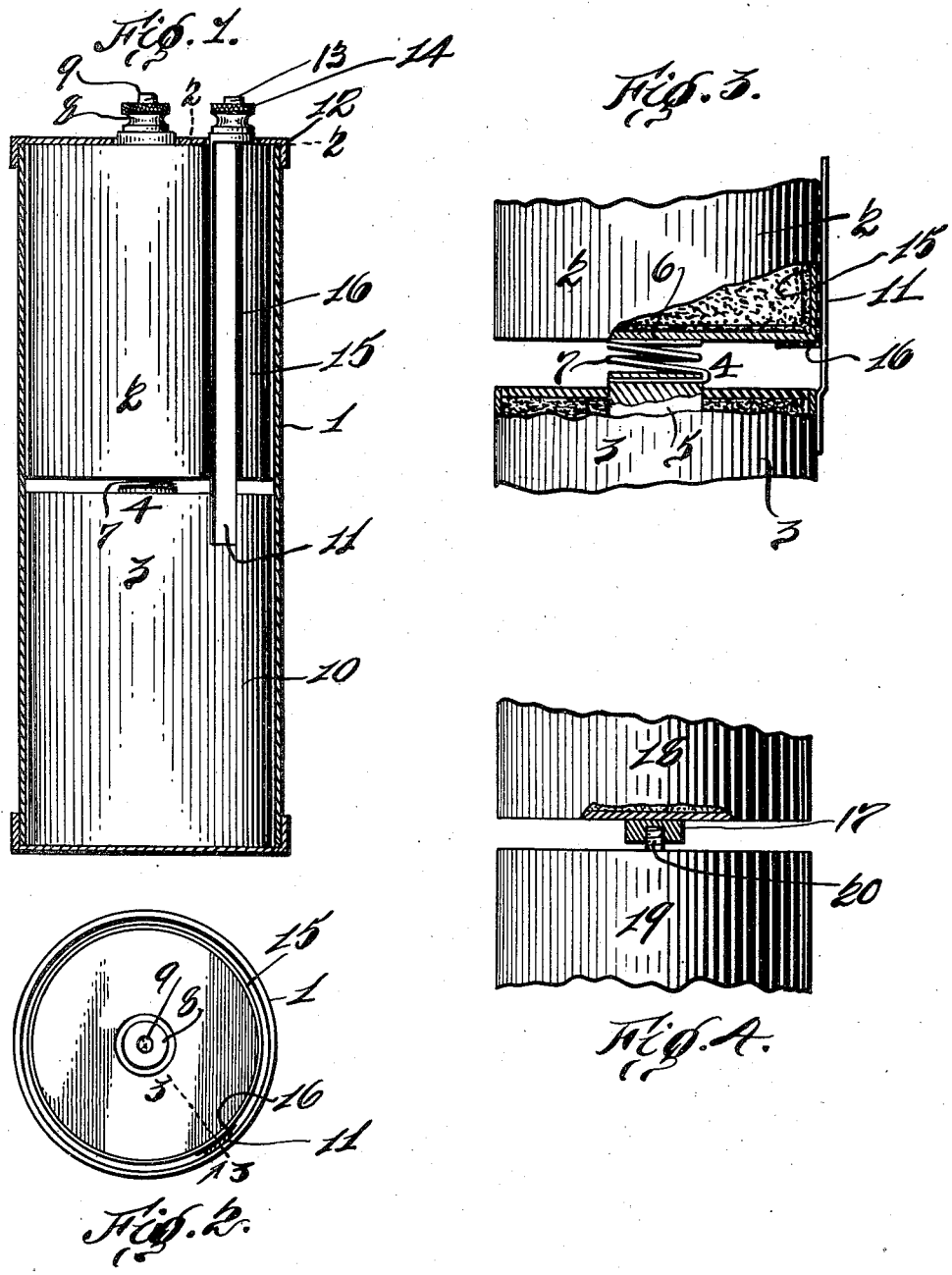

UNITED STATES PATENT OFFICE.

GUSTAV P. HEINRICH AND JAY E. DUNN, OF BROOKLYN, NEW YORK, ASSIGNORS TO INTERSTATE ELECTRIC NOVELTY COMPANY, OF NEW YORK, N. Y., A CORPORATION OF NEW YORK.

ELECTRIC BATTERY.

1,161,668.      Specification of Letters Patent.      Patented Nov. 23, 1915.

Application filed March 18, 1915. Serial No. 15,176.

*To all whom it may concern:*

Be it known that we, GUSTAV P. HEINRICH and JAY E. DUNN, the former a subject of the Emperor of Germany and the latter a citizen of the United States, both residing at Brooklyn, Kings county, State of New York, have invented certain new and useful Improvements in Electric Batteries, of which the following is a full, clear, and exact description.

This invention relates to an improvement in batteries and pertains more particularly to the manner of connecting same to obtain an increase of voltage.

Our improvement is directed mainly to dry-batteries, or that class of battery used for portable lamps and gas engine ignition. Our improved arrangement of such batteries enables one to get an increase of voltage, by connecting the batteries in series within the space occupied by a single dry cell. Furthermore, with our improved arrangement any jarring or jolting will not break the connection between the cells, and hence the batteries are well adapted for portable purposes or wherever any jarring or jolting takes place, for instance in motor-boats, aeroplanes or automobiles.

We will now proceed to describe our invention in detail, the novel features of which we will point out in the appended claims, reference being had to the accompanying drawing, forming part hereof, wherein,—

Figure 1 is a side elevation, partly in section, of our improved battery; Fig. 2 is a sectional plan view thereof, the cover of the casing being removed, the section being taken on a line 2—2 in Fig. 1; Fig. 3 is an enlarged fragmentary sectional view of the adjacent ends of two batery-cells separated to better illustrate the manner of connecting same, the section being taken on a line 3—3 in Fig. 2; and Fig. 4 is a similar view, illustrating a modified form of connecting the battery-cells.

Referring to the accompanying drawing, a casing for the dry-cells is indicated by 1, said casing in this instance containing two cells 2 and 3, the said cells being electrically connected at 4 (Fig. 1). The casing 1, herein illustrated represents the usual casing for a single cell, the output of which is one and one-half volts. By placing (in this instance) two cells, 2 and 3, within said casing and by reason of the series connection, we obtain an out-put of three volts, which is highly desirable for miniature lamp and ignition purposes. The amperage of the cells will depend upon the particular make; however, an increase of voltage is the essential desideratum aimed at by our improvement.

By referring to Fig. 3 it will be seen that the carbon-pole 5 of the lower cell 3 is connected to the zinc-pole 6 of the upper cell 2 by a yieldable connection 7 of conducting material, the upper end of said connection being soldered to the zinc, while the lower end may be passed into an opening in the carbon-pole; but any other form of connection can be used. The above described connection serves to connect the cells 2 and 3 in series, the upper end of the cell 2 being provided with a binding-nut 8 and post 9. For the other side of the circuit, we secure to the zinc-pole 10 of the cell 3 the lower end of a conductor or pole-piece 11, the said conductor comprising an elongated metallic strip extending upwardly and projecting above the cover 12 for the casing 1. The upper end of the conductor or pole-piece 11 is provided with a post 13, and binding-nut 14. To keep the conductor or pole-piece 11 out of contact with the zinc 15 of the cell 2, we provide a pad 16 of insulating material.

The yieldable connection 7 permits the cells to move apart when subjected to undue jarring or jolt without breaking the connection therebetween.

If desirable, the cells can be rigidly connected as shown in Fig. 4, by securing a nut or threaded block 17 to the zinc of the upper cell 18 and providing the carbon of the lower cell 19 with a threaded post 20 to engage the threaded opening in the block. In both forms, the conductor or pole-piece 11 and pad 16 will be utilized. Our improved arrangement of battery-cells provides a compact source of electrical energy, for the purposes set forth, by which a higher voltage can be obtained than from a single cell occupying the same space. The yieldable connection 7 serves to keep the adjacent ends of the cells 2 and 3 apart in order that the zinc-poles of said cells will not contact. It will also be seen by an inspection of Fig. 3 that the yieldable connection or conductor 7 is shown in the form of a wire coil, the wire being of low resistance. This allows for a certain amount of end play on the part of the batteries, while being inserted in the casing, without destroying the electrical connection.

Having now described our invention what we claim and desire to secure by Letters Patent is:

1. A casing, and a plurality of superposed dry cells located therein, in combination with flexible conductors for connecting said cells in series, a binding post connected to the carbon pole of the top cell, a flat rigid electrical conductor permanently secured directly to the zinc pole of the bottom cell, extending up by the side of said cells inside of said casing and insulated from all cells except the bottom one, and a binding post carried by the upper end of said last mentioned conductor.

2. A battery consisting of a plurality of superposed dry cells, an electrical conductor connecting said cells at their adjacent ends, an electrical conductor consisting of a flat strip of conducting material, secured at its lower end to the zinc of the lowermost cell and a strip of non-conducting material carried by the zinc of the uppermost cell and located under said conducting strip to maintain said strip out of contact with the zinc of the uppermost cell, a binding post carried by the conducting strip at its upper end and a binding post carried by the carbon pole of the uppermost cell.

Signed at New York city, N. Y. this 13th day of March, 1915.

GUSTAV P. HEINRICH.
JAY E. DUNN.

Witnesses:
H. DAVID,
SADIE LISSNER.